(12) United States Patent
Aliffi et al.

(10) Patent No.: US 7,480,406 B2
(45) Date of Patent: *Jan. 20, 2009

(54) COLOR BITMAP NORMALIZATION

(75) Inventors: Salvo Aliffi, Rome (IT); Filomena Ferrara, Taranto (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/117,417

(22) Filed: May 8, 2008

(65) Prior Publication Data

US 2008/0212876 A1 Sep. 4, 2008

Related U.S. Application Data

(63) Continuation of application No. 10/491,385, filed on Aug. 27, 2004, now Pat. No. 7,382,916.

(51) Int. Cl.
*G06K 9/00* (2006.01)
*G06K 9/36* (2006.01)
(52) U.S. Cl. ...................... 382/166; 382/232
(58) Field of Classification Search ................ 382/166, 382/232
See application file for complete search history.

(56) References Cited

U.S. PATENT DOCUMENTS

| | | | |
|---|---|---|---|
| 6,124,945 A | 9/2000 | Ishihara et al. | |
| 6,522,784 B1 * | 2/2003 | Zlotnick | 382/245 |
| 6,600,494 B1 * | 7/2003 | Turaccio et al. | 345/605 |
| 6,621,934 B1 * | 9/2003 | Yu et al. | 382/252 |
| 6,771,813 B1 | 8/2004 | Katsuyama | |
| 6,791,712 B1 | 9/2004 | Gerrits | |
| 6,808,118 B2 | 10/2004 | Field | |
| 6,865,302 B2 | 3/2005 | Chang | |
| 6,900,815 B2 | 5/2005 | Yoshioka | |
| 6,978,042 B1 | 12/2005 | Shin et al. | |
| 2002/0080153 A1 * | 6/2002 | Zhao et al. | 345/700 |
| 2003/0007695 A1 * | 1/2003 | Bossut et al. | 382/239 |
| 2003/0146925 A1 * | 8/2003 | Zhao et al. | 345/700 |

FOREIGN PATENT DOCUMENTS

FR 2711880 5/1995

(Continued)

*Primary Examiner*—Samir A Ahmed
*Assistant Examiner*—Max Shikhman
(74) *Attorney, Agent, or Firm*—Stephen J. Walder, Jr.; Jeff LaBaw

(57) ABSTRACT

In remote control systems (as in many other circumstances) the color representation of a bitmap is one of the heaviest factor in term of storage occupation and speed of transmission. Often, only a limited number of colors is actually used by a bitmap, so that the bit pattern of the single pixels is bigger than what is really needed to represent all the possible different colors.

With the present invention, in case the number of colors does not exceed a predetermined thresholds, a palette table containing all the colors used in the bitmap is created. The pixel representations in the bitmap are then replaced by a pointer to the corresponding entry in the palette table. This allows to reduce the total size of the bitmap. The reduced bitmap is then transmitted together with the associated palette table. The receiving computer (the controller in a remote control system) is able to rebuild the original bitmap with the help of the palette table.

15 Claims, 4 Drawing Sheets

FOREIGN PATENT DOCUMENTS

| | | |
|---|---|---|
| FR | 2717927 | 9/1995 |
| JP | 06-284296 | 10/1994 |
| JP | 06-333004 | 12/1994 |
| JP | 07-274007 | 10/1995 |
| JP | 11-030978 | 2/1999 |

* cited by examiner

COLOR BITMAP NORMALIZATION

This application is a continuation of application Ser. No. 10/491,385, filed Aug. 27, 2004, status awaiting publication.

The present invention relates to a method and system for reducing the storage occupation of a color bitmap, particularly for use in those system where a bitmap must be stored or transmitted through a network.

Bitmap size is a critical parameter, particularly when the bitmap is to be stored or transmitted over a network. The storage occupation in the first case and the speed of transmission in the latter can be heavily affected. For this reason many techniques have been developed for reducing the size of bitmaps and consequently their storage occupation and speed of transmission. One kind of application, even if not the only one, where this need is extremely important is "remote control". Remote control programs are a special category of communication applications; they go beyond just connecting a computer with another computer to actually taking control of it. By connecting through phone lines and modems or through LAN connections, these programs can put all the resources of one data processing system (e.g. a personal computer or a workstation), usually called the target, under the complete control of another data processing system (e.g. a personal computer or a workstation, connected with a LAN), usually called the controller. The controller screen duplicates the target one. The keyboard of the controller can enter characters directly on the target data processing system; the mouse of the controller can move the mouse pointer on the target screen. The controller screen constantly receives data from the target data processing system screen. Likewise, the keyboard of the controller sends data to the target data processing system every time a key is hit. For all practical purposes, the controller user may as well be sitting in front of the target data processing system.

This kind of remote control software can be useful in a number of circumstances. Just as an example an office personal computer system can be controlled and operated from home personal computers. If the office PC is left connected (e.g. to a modem), the control can be taken from the home PC and all the resources of the target PC can be controlled and used remotely. A more specific use is to dial in (e.g. via modem) to a network—connected PC at the office, log in, and run network applications or update shared files an the network.

The bottleneck caused by transmission lines can have a significant effect on the speed of remote control operations. To boost performances, remote control programs try to reduce and minimize the amount of data that needs to be transmitted over the communication lines (e.g. LAN or telephone cables). The refresh of the video image on the display screen of the target PC, which should be duplicated on the controller PC, constitutes the main factor in the transmission speed, due to the large quantity of information which has to be transferred. In the past, remote control programs worked by sending and refreshing the entire image of the target PC screen to the remote PC every fraction of a second. The constant rate at which the screen images were sent to the controller PC was called the screen refresh rate. The controller PC screen accurately reflected the target PC screen as changes at the target PC would be included in the next screen refresh. This approach was, of course, not very satisfactory in terms of speed, because of the enormous amount of data to be transmitted at each refresh.

Often, a change of the image is limited to a small section of the screen (e.g. pulling down a menu, highlighting an object) and only the changed data need to be refreshed. The controller system can use the screen data previously received and just refresh the modified part of the screen. By cutting out redundant screen refresh data, a remote control program can improve the response time. Cache memories speed the performance of hard drives and memory chips, and can also be useful for remote control programs. The idea behind a cache is to keep recently used data in a temporary storage area that is quickly accessible. If the data are soon needed again, it is much quicker to access them from a fast-access temporary storage area than to retrieve from the original source. According to this technique, elements of a recently displayed screen are saved as a cache in extended memory. The entire page redraws from the controller PC screen cache, eliminating the need to transfer large amounts of information over the modem from the target to the controller PC. Screen elements that are often redrawn from a screen cache include bitmaps, text and fonts.

In the transmission of a bitmap image, one of the heaviest information to send is the color of each pixel. In the well known RGB format, the color of each pixel is represented by three octets (i.e. three bytes having 8 bits each), one for the Red, one for the Green and one for the Blue. The maximum possible number of different colors is 16,777,216, i.e. $2^{**}24$. This representation with all the possible colors is called "true color".

In remote control systems (as in many other circumstances) this detailed color representation is not always needed and the transmission of all this information frequently constitutes an unwanted burden. Usually for the scope of the controller system, a poorer color image would be enough. For this reason, many remote control systems use color reduction algorithms to reduce the color representation from 24 (or 16) bits to 8 bits or even 4 bits. An example of a function implementing these algorithms is GetDIBits from Microsoft. A drawback of prior art color reduction functions is that they require a relatively long computation time to perform this color reduction, mostly due to the effort of creating a reduced image as close as possible to the original one. In remote control system, where these operations must be performed very often at a very high speed rate, the color reduction delay is unacceptable. An alternative reduction mechanism is the one implemented by Tivoli Remote Control by International Business Machines Corp and described in GB Patent Application 9917455.9. This mechanism has the advantage of a faster processing, balanced by a reduced precision in the correspondence between the resulting "reduced" colors and the original ones. This reduced precision is normally acceptable, particularly in remote control systems, and preferrable to a delay in computation. A method combining the speed and easiness of processing with the precision of the results would therefore be highly welcome.

It is an object of the present invention to provide a technique which overcomes the above drawbacks.

According to the present invention we provide a method for reducing the size of a bitmap, the bitmap representing a plurality of pixel each pixel being represented by a bit pattern, the method including the steps of:
    counting the number n of different bit patterns included in the bitmap;
    creating for later reuse a palette table having at least n entries, each one of the different patterns having at least one corresponding entry containing the bit pattern;
    replacing in the bitmap the bit patterns with a pointer to the corresponding entry in the palette table.

Also according to the present invention we provide a computer program including program code means for performing the method above when the program is run on a computer.

Various embodiments of the invention will now be described in detail by way of examples, with reference to accompanying figures, where:

Figure 1:
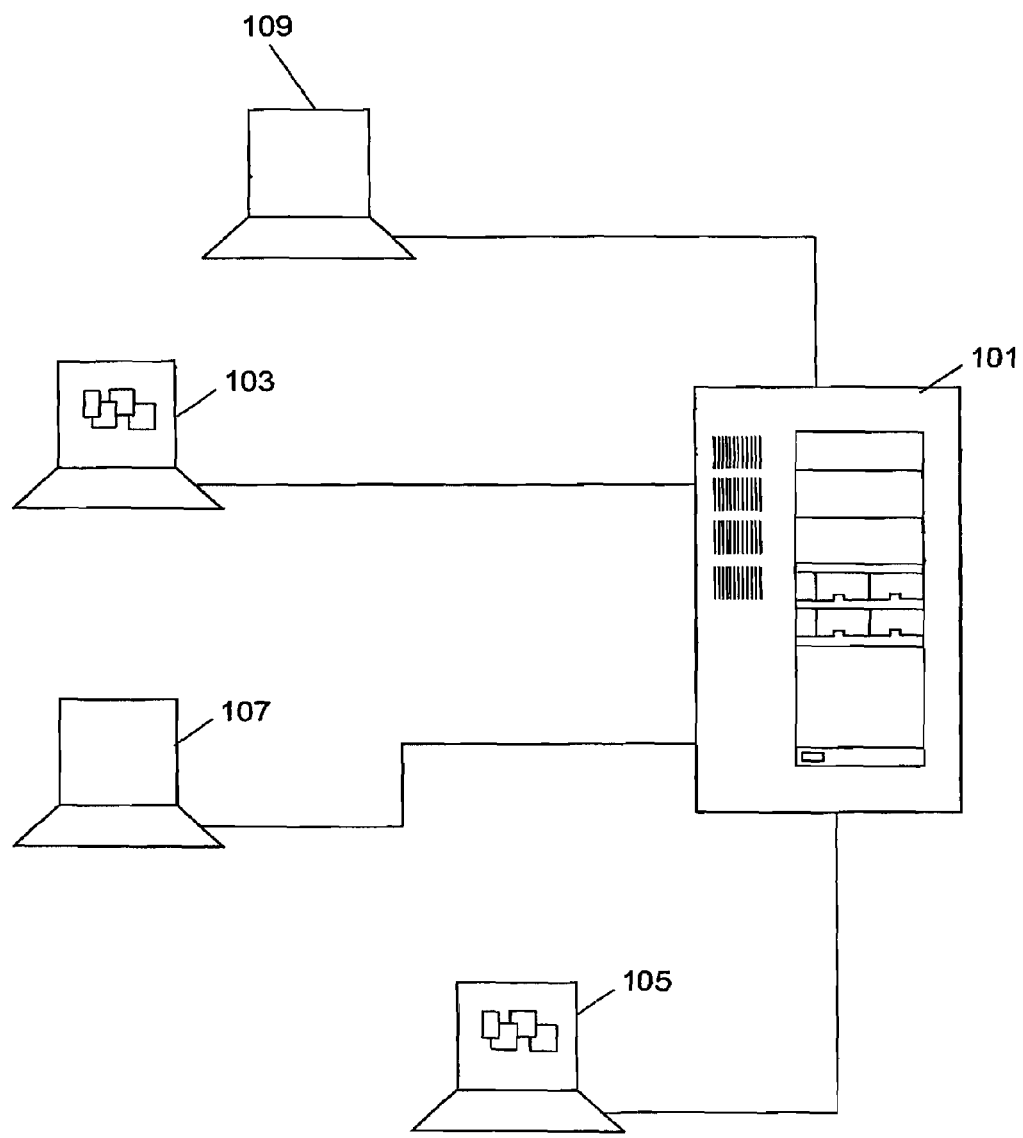
FIG. 1 shows schematically the network and the personal computers which may be utilized to implement the method and system of the present invention.

FIG. 1 illustrates an example of a typical Local Area Network (LAN) where a remote control system can be implemented. It comprises a LAN server 101 which acts as a communication bridge between two or more data processing systems. In other connection systems the function of the server would be performed, for example, by a bridge, a modem, a cable or, in general, any device that, interposed between two or more data processing system, makes them connected.

The data processing system 105 is the controller and can alternatively take the control of one of the other data processing system 103, 107 and 109.

Data processing systems 103, 105, 107 and 109 can be personal computers or workstations available on the market. They preferably include a display unit and a keyboard, coupled in a manner well known in the art. Additionally, the data processing systems include a processor system unit which may serve to mount a fixed disk drive and a diskette drive in addition to the main processor and memory. Further, in order to facilitate the utilization of a graphical user interface, the data processing systems preferably include a graphic pointing device, such as a mouse, which may be utilized to manipulate the position of a pointer within a visual display on the screen.

Those skilled in the art will appreciate that data processing systems described above may be implemented utilizing any state of the art personal computer, such as the Personal Computer manufactured by International Business Machines Corporation.

Data processing systems are usually provided with a graphical user interface (GUI) to allow a user to control the data processing system and to present the results of user actions on the system display. In a graphical user interface, applications and data are generally presented as objects depicted on a user interface. A user is then provided with a graphical, intuitive interface to a complex data processing system which permits graphic selection of depicted objects and manipulation of applications corresponding to those objects.

There are a number of different graphical user interface environments commercially available which utilize the arrangement described above. These environments include the System 7 operating system developed by Apple Computer, Inc. (System 7 is a trademark of Apple Computer, Inc.), the Windows graphical user interface developed by the Microsoft Corporation (Windows is a trademark of Microsoft Corporation) and the OS/2 Presentation Manager developed by International Business Machines Corporation (OS/2 and Presentation Manager are trademarks of International Business Machines Corporation).

The window environment is generally part of the operating system software that includes a collection of utility programs for controlling the operation of the computer system 100.

In the example shown in FIG. 1 system 103 is defined as the target system and all the resources of system 103 can be used and activated by the controller system. For performing such control, system 105 must be able to represent on its display an exact copy of the target display 103.

As mentioned above, one of the heaviest information relating to bitmaps is the color of each pixel of the original image. In remote control system, the level of precision requested is not usually very high and sending complete color information would waste transmission time. According to RGB format, the color of each pixel is represented by three octets (i.e. three bytes having 8 bits each), one for Red, one for Green and one for Blue. A subset of 256 of the possible 16,777,216 colors is usually enough for any applications. For remote control system, 16 colors are sometimes an acceptable compromise. These reduced representation make use of a sort of index (palette) which contains all the possible colors, usually in a "true-color" representation (i.e. three bytes). Another possible representation used in state of the art systems is the 64 k color bitmap. In a 64 k-color bitmap each pixel is represented by two bytes. These two bytes are not in this case an index in a 64 k long palette, but represent themselves the color. The sixteen bits are divided in three five-bit long groups. One bit is ignored. Each of these groups identifies the intensity of one of the basic colors: red, green, and blue.

Figure 2:
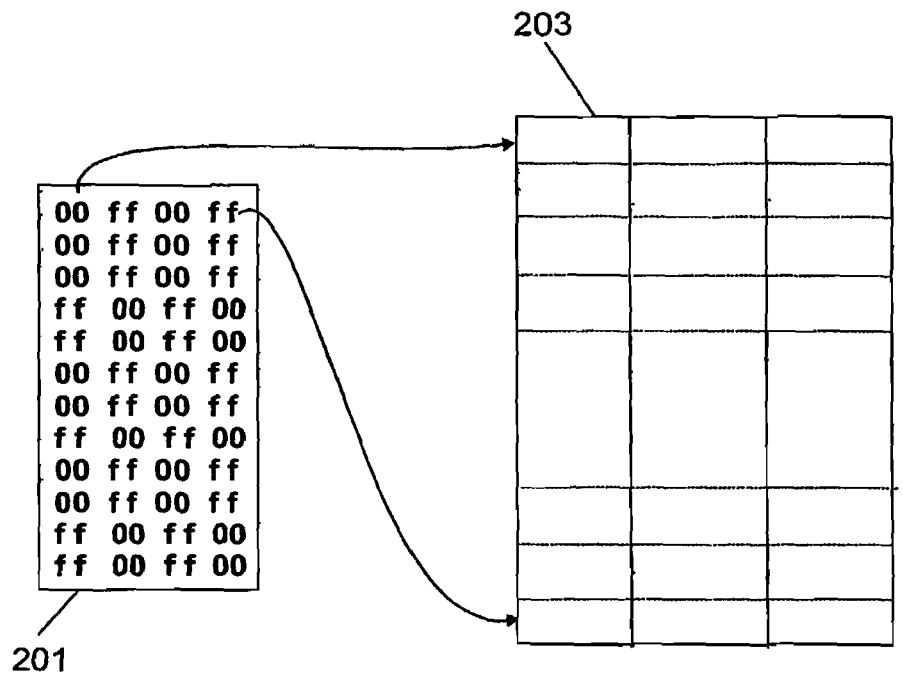
FIG. 2 shows a color palette according to the prior art.

FIG. 2 shows a state of the art color palette which implements a 256 color bitmap. Each pixel of the bitmap 201 will be 8 bits long. The 8-bit pixel in this case does not represent the color itself, but instead an entry to table 203 containing the physical colors used by the system. This table is called palette. The palette of a 256-color bitmap must necessarily have 256 entries: one for each color. Each entry is made up of three values, representing the amount of green, red, and blue, needed to render the desired color. The use of the color palette is a technique to normalize the bitmap and save a lot of space. In fact each entry is 3-byte long (RGB) against the 1 byte (8 bits) needed for each pixel. It is through this mechanism of indexing that the size of the bitmap is considerably reduced.

However it may happen, and it normally happens, that most of these colors are never actually used. The number of colors that a bitmap supports determines only the number of bits that are used in that bitmap to represent the color, and not necessarily the number of colors that are really in use. In other words, one thing is the theoretical number of colors that could be found in the bitmap and another thing is the number of colors really used in the bitmap.

In theory a 256 colors bitmap could even have only 1 color if it is an area that has been painted with a "solid brush"; 2 colors if it is an area painted with a 2 color brush, or containing some writings. This is a very usual occurrence in a remote control systems, because it is the classic case of a big portion of a written page (i.e. when a word processor is displayed on the screen). The same concept can be extended to 4 colors as well as 16. The method and system according to the present invention could be used even with bitmaps having a bigger numbers of colors, but the advantages could be reduced or even vanished.

Figure 3:
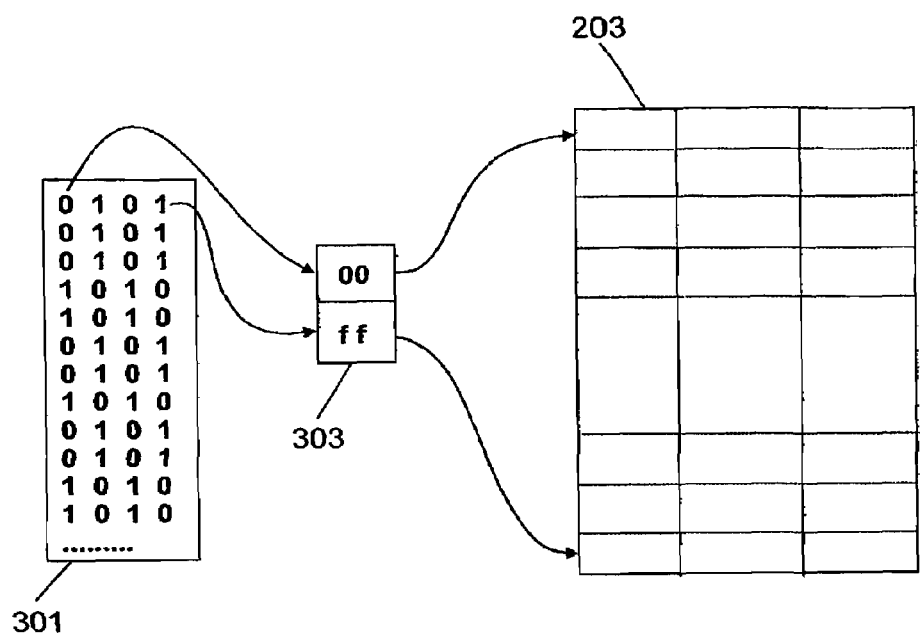
FIG. 3 shows an example of second level color palette system according to a preferred embodiment of the present invention.

According to the present invention, when one of the above circumstances arise (i.e. only a limited number of colors are really used within a bitmap) the original bitmap can be substituted by a "normalized" version which addresses only the colors actually used. In the example made in FIG. 1 above, only two colors are represented in the bitmap 201: the first (00 in hexadecimal representation) and last (FF) of the 256 possible colors. This means that 254 entries of table 203 will never be used by this bitmap. Each pixel in the bitmap requires 8 bits for representing the hexadecimal numbers (4 bits per digit) needed to address the 256 entries of the table 203. In this case a single bit would be enough to represent all the possible colors of the bitmap (0 and 1). A table (palette) with two entries having three bytes each could contain all he colors needed by the bitmap 201. According to a preferred embodiment of the present invention a "second level palette" can be interposed between the bitmap 201 and the palette 203 as shown as example in FIG. 3.

In bitmap 301 the pixel values 00 and FF have been substituted by 0 and 1, because the bitmap was actually using just two colors (corresponding to the first (00) and last (FF) hexadecimal entries of the color palette 203). The original bitmap 201 of FIG. 2 was using 8 bits per pixel, while the same information could be represented with just one bit per pixel. A bit can in fact represent just two values, which are enough in this case. The problem is how to match the two values of a bit to the two real entries in the 256-color palette. The answer is by using the 2nd level palette 303. The 2nd level palette is a way of normalizing the bitmap with respect to the number of colors really in use. It is a second level of indirection to the original color palette. In other words, referring to the above example, the bit value of 0 would address the first entry of the 2nd level palette, which would address the entry number 00 of the original palette. The bit value of 1 would address the second entry of the 2nd level palette, which would address the entry number of FF of the original palette.

The example above shows how the original bitmap could be theoretically reduced to one eighth of the original size with a very simple operation and without loosing the precision of the original representation. In this case it is enough to replace all the occurrences of the byte 00 with a bit value of 0 and all the occurrences of the byte FF with a bit value of 1. The new bitmap is therefore meaningful when coupled with its 2nd level palette. It is by the 2nd level palette that it is possible to rebuild the original bitmap.

Figure 4:
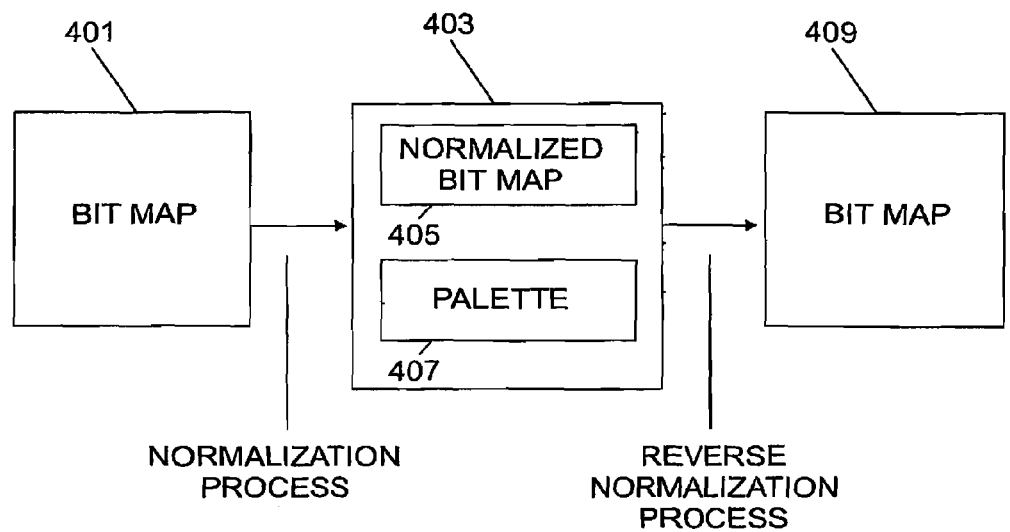
FIG. 4 shows the method a according to a preferred embodiment of the present invention.

FIG. 4 shows schematically the steps of a method according to a preferred embodiment of the present invention. A "normalization process" is applied to bitmap 401 to produce as output the package 403, which can be for example transmitted over a network. Package 403 includes a normalized bitmap 405 and the corresponding palette 407 which is needed to "decode" normalized bitmap 405. A "reverse normalization" process will receive package 403 as input and it will produce bitmap 409 as output. Bitmap 409 corresponds to original bitmap 401. In the example above of a remote control system (see FIG. 1) bitmap 401 must be transmitted over a network (e.g. A LAN) from a target computer (e.g. 103) to a controller computer 105. If the numbers of colors actually used in the original bitmap is limited (e.g. less than 16) it could be advantageous to reduce the size of the color bitmap 401 by applying the normalization process according to the present invention. This normalization process should be performed in the target computer 103 and it produces as output a normalized bitmap 403, and a palette 407. The normalized bitmap has a reduced size and it is easier and faster to be transmitted over the LAN to controller computer 105. When the normalized bitmap 403 is received by the controller computer 105 together with the palette 407, a reverse normalization process is able to build the bitmap 409 which is identical to original bitmap 401.

In the example made before the system uses a 256 color representation and a corresponding palette 203 (see FIGS. 2 and 3) is available both in target computer 103 and in controller computer 105. The pixels of bitmap 401 need therefore 8 bits each to be able to address 256 different colors. As mentioned before it may often happen that only a limited subset of these 256 colors is actually used. In this case it is advantageous to substitute the original bitmap 401 with a normalized bitmap 405, which addresses a "second level"

palette. This second level palette has as many entries as the maximum number of colors which can be represented in the normalized palette, according to the following table

| Palette entries | No. of colors | Bits per pixel |
|---|---|---|
| 1 | 1 | 0 |
| 2 | 2 | 1 |
| 4 | 3 or 4 | 2 |
| 16 | 4 < x <= 16 | 4 |
| 256 | x > 16 | 8 |

It should be noted that, in the first case no bitmap should be really transmitted, because only the single color is needed to reproduce the picture, while in the last (>16 colors used) there would be no advantage with the method of the present invention.

According to a preferred embodiment of the present invention the second level palette is obtained with the following steps:
  counting the number of colors actually used by the bitmap to be transmitted;
  if this number is less than 16, create a second level palette (having a size according to the table above) for addressing each one of these colors on the 256-color palette;
  substituting the original bitmap with a normalized bitmap where the pixels address the corresponding colors in the second level palette.

The present invention has been described in details with reference to a starting bitmap having a 256-color representation. Those skilled in the art will appreciate that this is just an example and the same techniques can be applied to various representations without big differences. Another possibility, in case the original bitmap uses a color representation with a bigger number of colors, is to perform a color reduction step before the normalization process of the example above. In many cases this wouldn't be an additional burden, because, as mentioned above, a color reduction technique is often used in state of the art remote control systems. According to a preferred embodiment of the present invention, a color reduction technique, as disclosed in GB Patent Application 9917455.9, is used to convert a 64 k-color bitmap (or even a "true-color" bitmap) to a 256-color bitmap. When this kind of color reduction is performed the whole bitmap is scanned pixel by pixel. A preferred embodiment of the present invention, takes advantage of this scanning for additional operations:
  to count the number of colors actually in use;
  to build the second level palette.

The same information can be obviously retrieved without necessarily modifying the color reduction algorithm, but it is reasonable to do so for higher efficiency.

The following are examples of the way the method steps described above could be implemented in a preferred embodiment of the present invention.

Counting the Number of Colors.

In the case of a 256-color bitmap, it is enough to allocate a 256 byte long array and a counter. Initialize the array and the counter to zeros. To count the number of colors you need to scan the bitmap. Every time that a new pixel is scanned, use the pixel as the index to this array. If the corresponding element value is still at 0, change it to 1 and increment the counter. When the scanning is complete the counter indicates the number of colors really used by the bitmap.

Normalization of the Bitmap.

In the case of a 256-color bitmap, it is enough to allocate a 256 byte indirection array. Again, it is obvious that this scanning, when possibly, should take advantage of a scanning of the existing method. A variable is needed that indicates which new entry in the indirection index array is being added. This array represents the translation of the corresponding palette entry in the 2 nd level palette. Therefore it turns out that only N entries will be used, where N is exactly the number of colors. The value that the other entries assume is meaningless. Those entries will never be accessed since there is no pixel in the original bitmap pointing to those locations. Every time a new color is encountered the pixel value itself is used as the index to this array (similar process used when counting the colors) and the corresponding entry is updated with the new value of the pixel in the normalized bitmap. The counter is then incremented. The same counter used to count the colors can be used if the two processes are combined together. Once this array is made, it is easy to build the second level palette and to perform the normalization of the bitmap, replacing all the occurrences of the original pixel with the corresponding entry of the indirection index.

While the indirection index is used in the normalization bitmap process, the second level palette is used to perform the reverse process. For this reason, the second level palette must be transmitted together with the normalized bitmap, so that the original bitmap can be obtained with a reverse process.

The second level palette is an output of the normalization process, and an input to the reversed normalization process.

In a normalized bitmap a pixel is represented with less bits than the original bitmap. The pixel is interpreted as an index to the 2nd level Palette where the expanded or original value of the pixel in the non-normalized bitmap is stored.

Reverse Normalization Process.

This process is supposed to restore the original bitmap from the normalized bitmap and the 2 nd level Palette. The process is exactly the reverse of the normalization one. Given the number of bits per pixel used by the normalized bitmap, the process is to replace the occurrence of each value with the corresponding entry of the 2nd level Palette.

It must be noted that the performances of method and system described above, when implemented in state of the art systems which store or transmit color bitmaps (e.g. remote control systems) could be affected by compression algorithms. It is therefore difficult to give an exact absolute dimension of the improvement in performances when using the present method. It has been estimated anyway that, when a limited number of colors is used in a bitmap (e.g. less than 16 in a 256 color representation), an average decrease of 20% in the size of the bitmap is obtained, with consequent reduction in transmission speed rate.

The invention claimed is:

1. A system for transmitting a bitmap of a digital image over a network, the network connecting a first and a second computer, the system comprising:
    means, in the first computer, for reducing the size of an original bitmap by:
    counting a number n of different bit patterns included in the original bitmap;
    determining if the number n of different bit patterns included in the original bitmap is less than a number of entries in a first palette data structure;
    creating, for later reuse, a second palette data structure having at least n entries, each one of the different bit patterns in the original bitmap having at least one corresponding entry in the second palette; and
    replacing, in the original bitmap, the bit patterns with a pointer to a corresponding entry in the second palette data structure to thereby generate a normalized bitmap, wherein each of the entries in the second palette data structure provide a pointer to a corresponding entry in the first palette data structure containing an indication of a color to be displayed when representing a bit pattern corresponding to the entry in the second palette data structure, wherein the processor performs the create and replace operations in response to the number n of different bit patterns included in the original bitmap being less than a number of entries in the first palette data structure;
    network means for transmitting the normalized bitmap and the second palette data structure from the first to the second computer; and
    means, in the second computer, for obtaining the digital image using the normalized bitmap and the second palette data structure.

2. The system of claim 1, wherein the second computer is used for remotely controlling the first computer over the network.

3. An apparatus for reducing the size of a bitmap, the bitmap representing a plurality of pixels, each pixel being represented by a bit pattern, the apparatus comprising:
    a processor; and
    a memory coupled to the processor, wherein the processor:
    counts a number n of different bit patterns included in an original bitmap stored in the memory;
    determines if the number n of different bit patterns included in the original bitmap is less than a number of entries in a first palette data structure;
    creates, for later reuse, a second palette data structure having at least n entries, each one of the different bit patterns in the original bitmap having at least one corresponding entry in the second palette; and
    replaces, in the original bitmap, the bit patterns with a pointer to a corresponding entry in the second palette data structure to thereby generate a normalized bitmap, wherein each of the entries in the second palette data structure provide a pointer to a corresponding entry in the first palette data structure containing an indication of a color to be displayed when representing a bit pattern corresponding to the entry in the second palette data structure, wherein the processor performs the create and replace operations in response to the number n of different bit patterns included in the original bitmap being less than a number of entries in the first palette data structure.

4. The apparatus of claim 3 wherein each entry in the first palette data structure represents a color in a three color representation.

5. The apparatus of claim 3, wherein the processor performs the counting, determining, creating, and replacing operations in response to another computing device remotely accessing the apparatus.

6. The apparatus of claim 3, wherein the processor further:
    generates a package comprising the second palette data structure and the normalized bitmap; and
    transmits the package from the apparatus to an external device.

7. The apparatus of claim 6, wherein the external device remotely controls the apparatus.

8. The apparatus of claim 7, wherein the original bitmap is a bitmap of a portion of a display being presented on the apparatus.

9. The apparatus of claim 8, wherein the external device receives the package and recreates the original bitmap based on the second palette and the normalized bitmap.

10. The apparatus of claim 9, wherein the external device recreates the original bitmap by correlating entries in the second palette data structure with entries in the first palette data structure and correlating pointers in the normalized bitmap to entries in the second palette data structure.

11. The apparatus of claim 3, wherein if the number n of different bit patterns is less than or equal to 16 and greater than 4, a number of entries in the second palette data structure is 16 and a number of bits in each of the pointers in the normalized bitmap is 4.

12. The apparatus of claim 3, wherein if the number n of different bit patterns is greater than 2 and less than or equal to 4, a number of entries in the second palette data structure is 4 and a number of bits in each of the pointers in the normalized bitmap is 2.

13. The apparatus of claim 3, wherein if the number n of different bit patterns is 2, a number of entries in the second palette data structure is 2 and a number of bits in each of the pointers in the normalized bitmap is 1.

14. The apparatus of claim 3, wherein the processor further performs a color reduction operation on the original bitmap before counting the number of different bit patterns in the original bitmap.

15. The apparatus of claim 3, wherein the processor counts a number n of different bit patterns in the original bitmap by:
   initializing an array and a counter;
   scanning the original bitmap;
   during scanning of the original bitmap, when a new bit pattern is encountered, the bit pattern is used as an index into the array and a corresponding entry in the array is set to 1; and
   during scanning of the original bitmap, when a new bit pattern is encountered, incrementing the counter.

* * * * *